INVENTOR.
Raymond G. Katter
Joseph L. Katter
BY
Their Attorney

United States Patent Office 3,667,963
Patented June 6, 1972

---

3,667,963
METHOD OF MAKING PIZZA
Raymond G. Katter, 2833 Banbury Road, and Joseph L. Katter, 6818 South 2030 East, both of Salt Lake City, Utah 84121
Filed Dec. 17, 1969, Ser. No. 885,750
Int. Cl. A21d 13/00
U.S. Cl. 99—86
6 Claims

ABSTRACT OF THE DISCLOSURE

A pizza or similar food product is prepared by slicing a baked roll, applying a sealing layer of margarine to the soft interior surface of the roll, applying a liquid sauce over the sealing layer, and baking the resulting combination.

---

The present invention comprises a pizza or other type food product and preferred method of making same and, more particularly, to a new and improved product which, though having a soft dough interior, will not become soggy or otherwise undesirable when a pizza or other sauce is applied.

In the past there have been devised many different types of pizzas, otherwise known as pizza pies. Indeed, this is a very popular item currently and in the fast-food industry, whether of the restaurant or take-out type. Pizzas, as they are commonly known, are generally formed of an unbaked dough base which, when baked, is unraised and sometimes objectionable to persons having less than hardy digestive constitutions. Further, while manual preparation of the dough base prior to baking is oftentimes a desired attraction, the same is very time consuming; furthermore, many individuals do not care for as much food product as a large or even a small, pizza-pie product affords.

It would be desirable, of course, to have a similarly flavored product as a pizza available, but where the labor time involved in preparation, as well as the cost thereof, is materially reduced. It likewise would be desirable to provide a pizza-type product wherein a softer dough could be used without rendering the same soggy through the use of conventional, rather liquid or wet pizza or other desired sauce.

Accordingly, a principal object of the present invention is to provide a new and improved food product.

An additional object is to provide a new and improved method for making a topping-type food product.

A further object is to provide a pizza-type product having as a base, a roll with a soft, raised-dough interior.

An additional object is to provide a pizza product having as a base a soft roll interior which is provided with a sealer such as a suitable seasoned margarine, this to protect such interior during baking and to prevent sauce subsequently deposited thereon from soaking into the doughy area of the roll base.

A further object is to provide a method of manufacturing a pizza product wherein, by use of a spread sealer, the dough base of the food product can be constituted by a soft, desirable doughy substance.

An additional object is to provide a pizza type food product which can be prepared in a minimum amount of time, this by the preferred method described herein.

An additional object is to provide a food product wherein a slit hard roll may be used to provide two bases for a pizza-type product, each base having a doughy interior of soft constituency, the latter to increase the edible nature of the food product.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
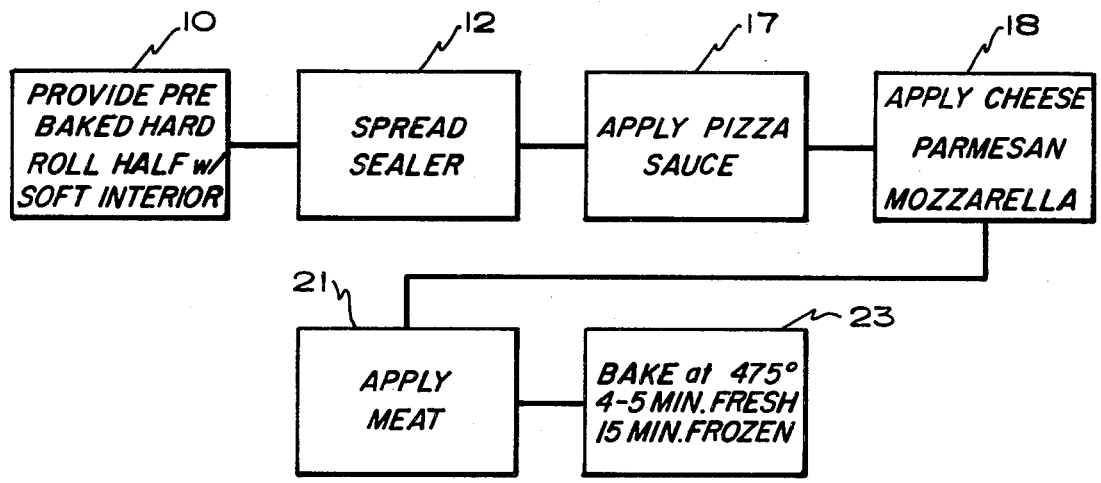
FIG. 1 illustrates in block diagram form the method or flow-diagram of the method of the present invention.
Figure 2:
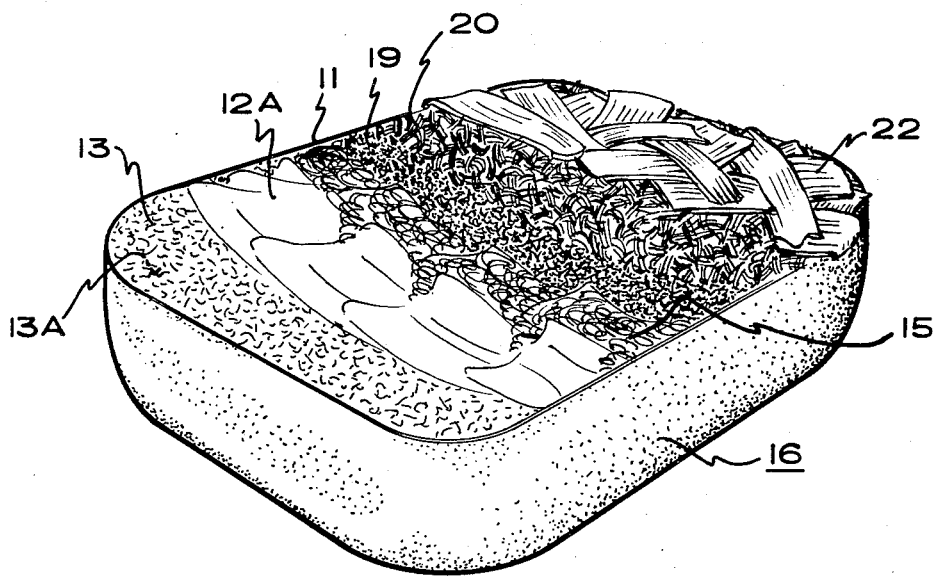
FIG. 2 is a perspective view of the food product contemplated by the present invention; in particular, the toppings of the base roll of the invention to illustrate the successive layers of the spread (on the bottom), sauce, cheese (two types), and meat.

Referring to FIG. 1, the first step at 10 is to provide a pre-baked hard roll half 16 with a hard outer crust and soft, raised-dough interior. A suitable item would be a small, dinner-size French roll which is slit in two through its longitudinal axis along a horizontal plane. In practice, these "rolls" should be pre-formed and baked, much the same as conventional French type dinner rolls, but with the outer periphery being generally square or rectangular in configuration. Kindly note the periphery 11 in FIG. 2. By providing a roll of substantially rectangular cross-section as to horizontal periphery, more rolls of the same general size can be accommodated on a given baking sheet.

It is to be noted that by forming the product having a soft interior, digestion will be aided for persons having an antipathy or aversion to the conventional, compacted and rather tough pizza dough. The hard outer crust facilitates hand-inverting and dipping the roll into pizza sauce, later explained.

The next step in the process or method as at 12 in FIG. 1 includes the spreading of an edible sealer 12A on the top surface 13 of the cut roll. It is noted that surface 13 will be soft and spongy as common with conventional raised-dough interiors of dinner rolls. In the absence of the inclusion of sealer 12, such interior as at 13A by virtue of its own porous nature and capillary action, would tend to absorb the highly liquid pizza or other sauce 15 applied to the roll 16 and thus become soggy. The sealer 12A preferably comprises a margarine that is garlic-flavored. However, butter or other types of sealers may be used as well.

The next step as at 17 is to apply a sauce to the roll 16. This is advantageously performed by inverting the roll half 16 and dipping the same into a container of pizza or other sauce such that preferably solely the "cut" surface of the roll with the sealer 12 touches the sauce. It has been found through experimentation that the margarine sealer or butter sealer by way of example, while sufficient to prevent the penetration of the sauce into the bready interior of the dough, will nonetheless have a sufficient constituency so that the sauce will adhere to the sealer.

The next step as at 18 is to apply cheese to the roll item. This cheese will be applied of course directly over the sauce and can be shaken or sprinkled on. By way of preference, the first cheese should be a powdered cheese such as Parmesan as at 19, followed by mozzarella cheese. The latter is provided to restaurants in brick form, is meltable, and may be either grated, crumbled, or otherwise prepared for easy deposit upon the product.

The next step as at 21 in FIG. 1 is to apply meat 22. This meat may constitute a ground beef, ham, or other type of meat such as sausage, pepperoni, and so forth.

The final step in the process 23 is to bake the product at approximately 475° F. for a period of four to five minutes, this when the product is prepared fresh and is baked for immediate consumption. If the product is to be frozen for storage before baking, then removal from storage will be followed by a baking period at 475° F. for approximately 15 minutes.

As to the method, the advantages in this invention are several. In the first place, the roll base can be provided by a conventional bakery or otherwise pre-prepared. Secondly, the roll being severed, will provide two halves or two bases for the subject pizza product. Third, the roll in being cut, will provide a soft doughy interior which is preferred by many persons over the conventional hard pizza dough.

Spreading the sealer, i.e. margarine, in the second step of the method, seals the raised-dough interior so the same will not dry out during baking. In addition, and most important, the pizza sauce in being applied subsequently to the sealer will not soak into the interior of the roll half, to render such interior soggy.

Applying, first, the powdered, non-meltable Parmesan cheese adds flavor to the subject; applying mozzarella cheese provides a food product that can be melted and semi-liquified during the baking process, so as to retain intact the powdered cheese and provide savoriness, in addition to functioning as an agent by which the subsequently deposited meat is adhered to the food product.

The next to last step, applying meat, prior to baking, completes the product. Subsequently, the product is baked immediately before serving.

It is noted that the object made in accordance with the above method, can be made very inexpensively with a minimum of labor time involved. As to the product itself, see FIG. 2, the same can be baked in multiple items per batch, in a minimum of space. The same is savory since the liquid sauce can be applied over the margarine sealing the soft-dough of the roll without making the interior of the roll soggy or otherwise objectionable.

While particular embodiments of the present invention have been shown and described, it will be obvious to those skilled in the art that changes and modifications may be made without departing from this invention in its broader aspects.

We claim:
1. The method of making a food product comprising the steps of providing a pre-baked roll having a soft, raised-dough interior and upper surface, applying margarine as a sealer directly over said upper surface to cover the same thereby preventing said interior from drying out during baking as well as preventing the seepage of liquid sauce into said interior, applying a liquid sauce over said sealer, applying desired food products over said sauce, and baking said food product.

2. The method of claim 1 wherein said sealer comprises a garlic-seasoned margarine.

3. The method of claim 1 wherein said providing step comprises the step of providing half of a cut, pre-baked hard roll having a soft, raised-dough interior culminating in a soft upper surface.

4. The method of claim 3 wherein said sauce applying step comprises inverting said roll and dipping said upper surface, covered by said sealer, into said liquid sauce.

5. The method of claim 1 wherein said food products applying step comprises applying cheese, and then applying meat.

6. The method of claim 5 wherein said food products applying step comprises applying a powdered cheese over said sauce, and then applying a meltable cheese over said powdered cheese.

References Cited

UNITED STATES PATENTS

| | | | |
|---|---|---|---|
| 2,668,117 | 2/1954 | Bucci | 99—92 X |
| 2,547,206 | 4/1951 | Hanau | 99—92 |

OTHER REFERENCES

Betty Crocker's Good and Easy Cookbook, New York, 1954, pp. 41–42.

RAYMOND N. JONES, Primary Examiner

J. R. HOFFMAN, Assistant Examiner

U.S. Cl. X.R.

99—92